Figure 11:
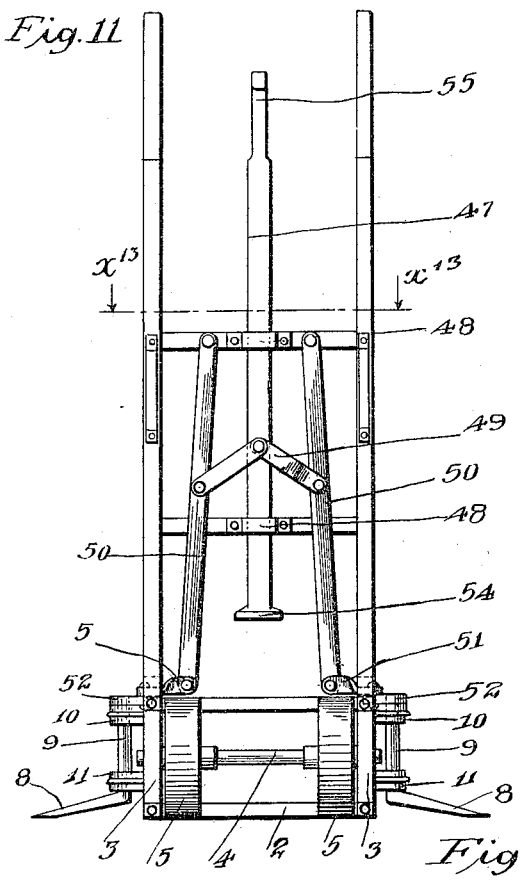

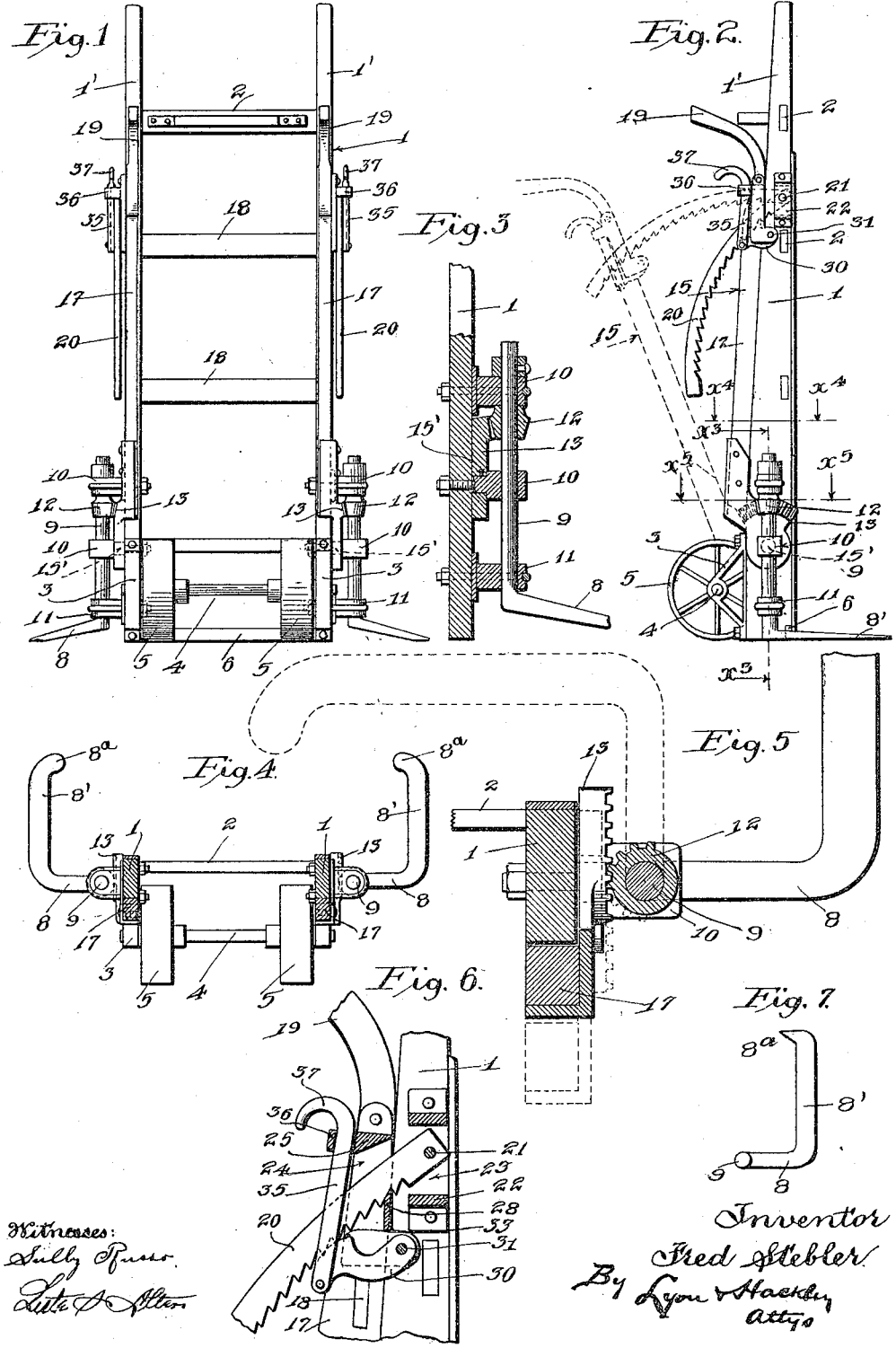

F. STEBLER.
HAND TRUCK.
APPLICATION FILED MAY 26, 1913.
1,193,729.
Patented Aug. 8, 1916.
3 SHEETS—SHEET 2.
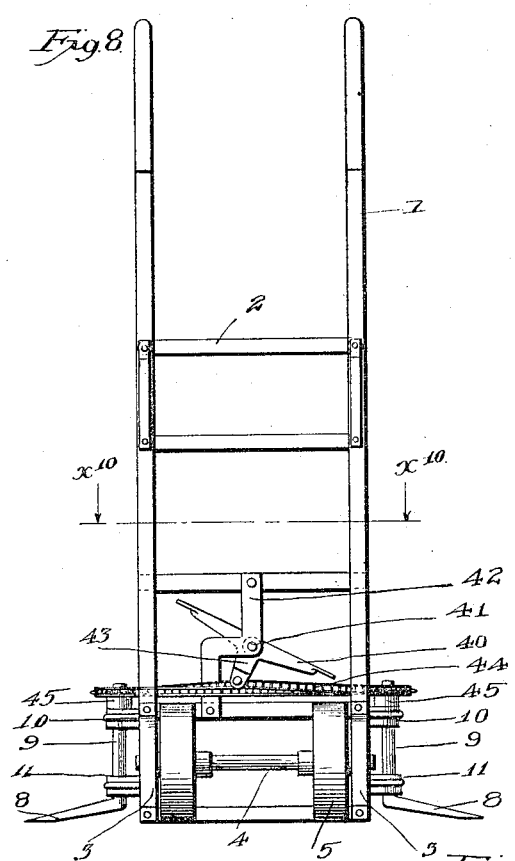
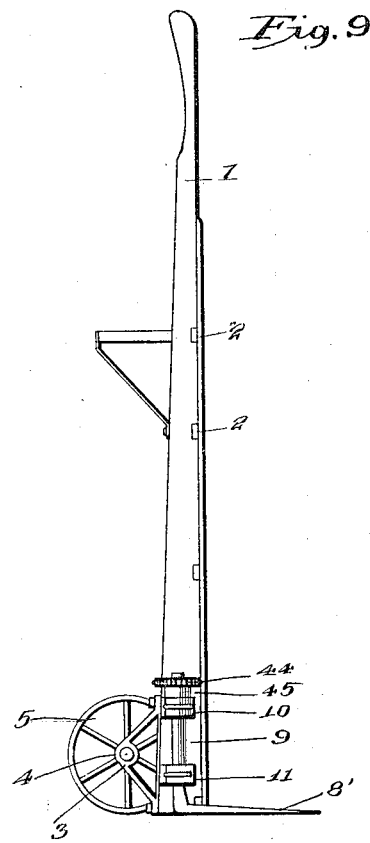
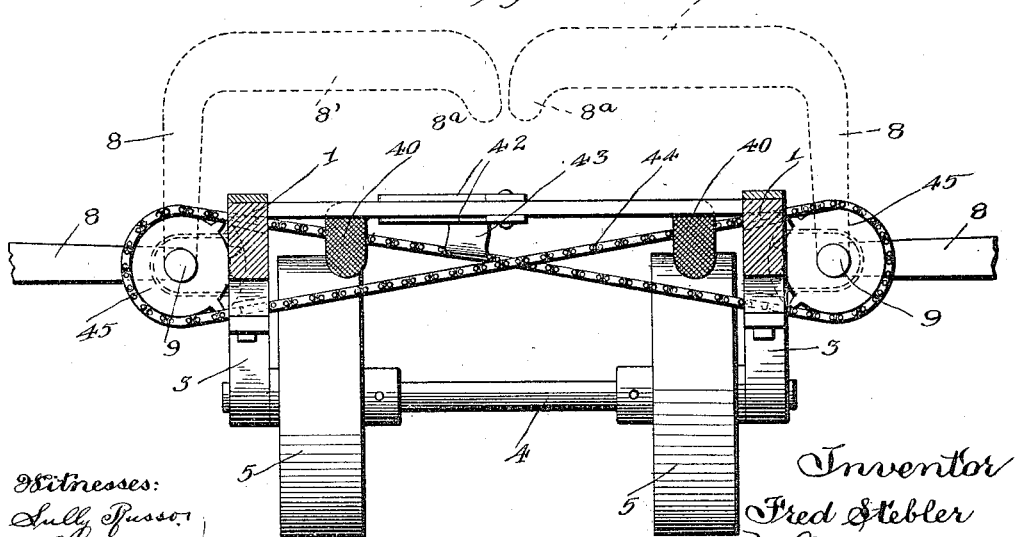
Witnesses:
Inventor
Fred Stebler
By Lyon+Hackley
attys

F. STEBLER.
HAND TRUCK.
APPLICATION FILED MAY 26, 1913.

1,193,729.

Patented Aug. 8, 1916.
3 SHEETS—SHEET 3.

Witnesses:
Sally Russo
Lute A. Stter

Inventor
Fred Stebler
By Lyon & Hackley
Attys

UNITED STATES PATENT OFFICE.

FRED STEBLER, OF RIVERSIDE, CALIFORNIA.

HAND-TRUCK.

1,193,729.   Specification of Letters Patent.   Patented Aug. 8, 1916.

Application filed May 26, 1913. Serial No. 770,062.

*To all whom it may concern:*

Be it known that I, FRED STEBLER, a citizen of the United States, residing at Riverside, in the county of Riverside and State of California, have invented a new and useful Hand-Truck, of which the following is a specification.

This invention relates to trucks for picking up, carrying, and depositing portable articles, and one object of the invention is to provide a truck that can be used as an all around or general purpose truck capable of handling all of the articles, such as boxes, barrels, cases, bags, etc., which have to be handled in warehouses and the like.

Another object of the invention is to provide a truck that may be used for picking up and carrying any and all of such articles, whether they are such as can be clamped or gripped, as in the case of boxes, etc., or require to be supported on a nose support extending beneath the same, as in the case of bags.

Another object of my invention is to provide a truck which can be utilized to firmly grasp, by movable clamping members, a single box or the bottom box of a tier of boxes and transport the same without the necessity of tipping the tier of boxes to permit engagement of the truck with the box or boxes, or which may be utilized to lift and transport a box or tier of boxes, without first tipping the box resting on the floor to load the same on the truck, by means of pivoted or movable members capable of being positively slid under such box thus forming a supporting means or "nose" capable of being slipped by the operator under the box without the operator touching the box, or which may be utilized as an ordinary "nose" truck when so desired.

Another object of the invention is to provide a truck whether adapted to clamp the box or adapted to lift the box or tier of boxes from contact with the bottom, in which the clamping or supporting members are arranged at or close to the lower end of the truck when in vertical position, these members extending in front of the truck frame and pivoted thereto to swing in a horizontal plane to the load when operated toward closed position.

Another object of the invention is to provide a very wide range of movement of the clamping or supporting members, thus adapting the truck for use with boxes or other articles, varying greatly in sizes or proportions, such as are usually found in general warehouses.

Other objects of the invention will appear hereinafter.

Figure 12:
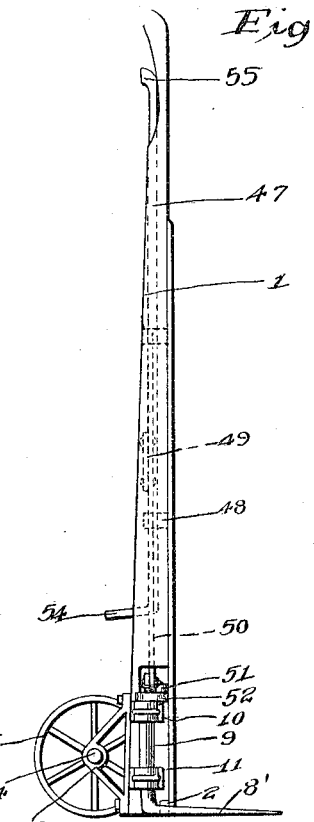
Figure 13:
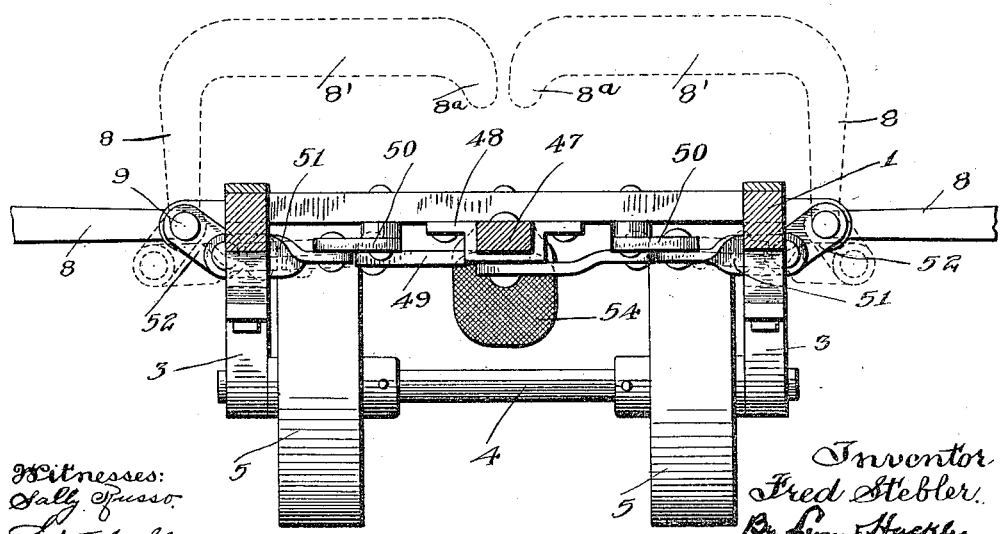

The accompanying drawings illustrate embodiments of my invention, and referring thereto:

Figure 1 is a rear elevation of the truck. Fig. 2 is a side elevation thereof, showing the clamp operating handles in full lines in normal position, and dotted lines in operative position, the clamp member being shown in slightly modified form. Fig. 3 is a vertical section on line $x^3$—$x^3$ in Fig. 2, the clamp member however corresponding to that of Fig. 1. Fig. 4 is a horizontal section on line $x^4$—$x^4$ in Fig. 2. Fig. 5 is a horizontal section on line $x^5$—$x^5$ in Fig. 2. Fig. 6 is a vertical section through the retaining means for the clamp operating device. Fig. 7 is a plan view of a modified form of clamp jaw. Fig. 8 is a rear elevation of another form of truck, embodying my invention. Fig. 9 is a side elevation of the form shown in Fig. 8. Fig. 10 is a section on line $x^{10}$—$x^{10}$ Fig. 8. Fig. 11 is a rear elevation of another form of the invention. Fig. 12 is a side elevation of the form shown in Fig. 11. Fig. 13 is a section on line $x^{13}$—$x^{13}$ shown in Fig. 11.

Referring to Figs. 1 to 4, the truck frame is provided with the usual side bars 1 connected by cross bars 2, and provided with bearings 3 for the shaft 4 of the truck wheels 5. The upper ends of the side bars 1 are formed as handles 1'. At the lower end of the truck frame a cross bar 6 is provided, adapted to rest flat on the floor when the truck frame is in vertical position, said truck wheels 5 also resting on the floor at this time. Mounted at each side of the truck frame is a movable clamping member comprising a clamp arm 8, carried by a vertical shaft 9, pivotally mounted in bearings 10 and 11 on the side bar 1 of the truck frame, said clamping arm being provided at its outer end with a gripping or clamping jaw 8' which is preferably flattened so as to enable it to be pushed beneath a box in the manner of a nose, and is provided with a projection 8$^{\text{a}}$ adapted to engage the side of a box when it is desired to use the truck as a clamping truck. This projection may be a flat wedge, as shown in Figs. 1 to 5, or in case a stronger catching action is required, the projection may be pointed as shown at 8ª in Fig. 7. Means are provided for rotating the shafts 9 to swing the clamp arms 8 inwardly or outwardly into position in front of the truck, said means consisting, for example, of beveled segmental pinions 12 on said shafts, engaged by bevel segment gears 13 on an operating device consisting of a frame 15 mounted to turn on pivots 15' on the truck frame, said frame extending upwardly at the rear of the truck frame and being provided with side bars 17 connected by cross bars 18 and provided with handles 19 at their upper ends, which in normal position, lie close to the handle portions 1' at the upper ends of the truck frame bars 1. By swinging this operating member or frame 15 away from the main truck frame, the clamp arms 8 are operated through the gears 13 and 12 so as to swing the outer ends of the clamp arms inwardly in front of the truck frame into position for clamping a box in front of the truck, and in order to hold the parts in such position, a retaining device is provided consisting of two segment racks 20 pivoted at 21 on fittings 22 on the respective side bars 1 of the truck frame, and extending through a slot 23 in said fittings and through a slot 24 in a fitting 25 on the operating frame 15, said fitting 25 having a projection or knife edge 28 with which the teeth of said segment rack engage to retain the operating frame in operating position, said segment rack resting on said projection by its own weight. To withdraw said segment rack from said projection, a lifter is provided consisting of an arm 30 pivotally mounted at 31 on the fitting 25 at each side of the operating frame and provided with a face 33 adapted to engage and lift the segment rack 20 when said arm 30 is lifted, such lifting of the arm being effected by a link 35 pivoted to said arm and slidably mounted in a guide 36 on said fitting 25, and provided at its upper end with a finger grip 37 whereby it may be raised to disengage the retaining device. Said finger grip 37 is preferably arranged sufficiently near to the handles 19 on the operating frame to enable manipulation of the retaining device without removing the hand from such handle.

The operation of this form of my invention is as follows: In case the truck is to be used as an ordinary nose truck, the operating frame 15 is pulled back to position shown in dotted lines in Fig. 2, causing the clamp arms 8 to be swung forwardly and inwardly to position in front of the truck, as shown for one of the arms in dotted lines in Fig. 5, the arms being locked in this position by the operation of the retaining means above described. With the parts in this position and by using the handles 19 the truck may be wheeled up to a pile of boxes or bags, and such pile being tipped forward slightly, the flattened jaw portions 8' of the jaws 8 may be pushed beneath the boxes, bags or other articles in the manner of an ordinary truck nose and the articles then tipped back against the truck frame and supported by the nose while the truck is being wheeled. In case it is desired to use the invention as a clamp truck, it is wheeled up to the pile of boxes or other articles while in position shown in full lines in Fig. 2, and is then tipped up sufficiently to bring the outer ends of its jaws far enough above the floor to engage the ends of the lower box of the pile, and the operating frame 15 is then pulled rearward, causing the clamp arms to swing forwardly and inwardly into contact with the ends of the boxes, the retaining means above described then locking the clamping means in this position. The truck being then tipped back slightly, the pile of boxes is caused to rest against the truck frame, its weight being supported by the clamp arms while the boxes are being wheeled to the desired point. Then, by lifting the finger piece 37, the releasing arm 30 is caused to raise the segment rack 20 off the projection 28 and the operating frame 15 is then pushed forward to normal position, thereby releasing the clamp arms from the ends of the box.

When the truck above described is used as a nose truck, the jaws or arms 8 may be pushed beneath the load either by direct forward movement in the manner of an ordinary nose truck, the jaws or arms being in that case swung inward and forward before the truck is pushed up to and beneath the load, or if desired, the truck may be pushed up to the load while its arms are extended and the latter operated by the operating means 15 to cause them to be pushed forward and inward beneath the load, the flattening of the jaws being such as to permit of their being inserted beneath the load either by forward, or by lateral inward movement.

In the form of the invention shown in Figs. 8 to 10, the side bars 1, the clamp arms 8 and the pivot shafts 9 for said clamp arms mounted in said bearings 10 and 11 on the side bars 1 of the truck frame are substantially as above described, the operating means for the pivot shafts 9 for said clamp arms being, however, in this case a foot lever 40 pivoted at 41 on a bracket 42 on the truck frame, and having an arm 43 connected to a chain 44 which passes over sprocket wheels 45 on the respective shafts 9 aforesaid, said chain being crossed as shown so as to cause the shafts 9 to be rotated in opposite directions and thereby swing the clamp arms 8 inwardly and outwardly toward or from one another by simultaneous movement. In this embodiment of the invention it is seen that the pivoted frame, in the form of a foot lever 40, is utilized to actuate the pivot shafts through suitable gearing; that shown in the drawings being sprocket and sprocket chain. Other forms of gearing could be readily substituted for such sprockets and chain. This form of my invention is capable both for use as a clamp truck and a nose truck, the operation being similar to that above described, except that the operation of the jaws is effected by the foot lever instead of by a manually operated swinging frame.

Any other suitable means may be used for operating the shafts 9 carrying the clamp arms. Thus as shown in Figs. 11 to 13, said shafts may be operated by a bar 47 mounted to slide vertically in guides 48 to the truck frame and connected by toggle links 49 with levers 50 pivoted on the truck frame, and connected by links 51 with arms 52 on the shafts 9 carrying the respective clamp arms 8. The operating bar 47 may be provided at its lower end with a pedal 54 and at its upper end with a handle 55 to facilitate operation thereof. By pushing the bar downward the levers 50 are swung outwardly and operate through the links 51 and arms 52 to turn the shafts 9 so as to swing the clamp arms 8 inwardly and forwardly into operative position. The parts are preferably so proportioned and arranged that when the downward movement of the operating bar 47 is completed the toggle links 49 are substantially on a dead center, so as to hold the clamp arms locked in closed or operative position. To move the clamp bars back to normal position, it is only necessary to raise the operating bar 47 by pulling on the handle 55 at the upper end thereof, this movement breaking the toggle lock and drawing the levers 50 inwardly, so as to swing the clamp arms outwardly and rearwardly.

What I claim is:

1. A truck comprising a frame and supporting wheels near one end constructed for transporting articles in a substantially vertical position of the frame, supporting members mounted on axes extending longitudinally of said frame and movable on said axes in a single plane transverse of the truck frame to support articles in front of the frame, and means for simultaneously operating said supporting members.

2. A truck comprising a frame provided with supporting wheels, clamp arms movably mounted on the respective sides of said frame to swing in a single plane disposed at a right angle to the longitudinal extension of the truck frame, inward and forward in front of the truck, and operating means movably mounted on the truck frame and connected to said clamp arms to operate the same simultaneously, said operating means having a pair of handles disposed below the upper ends of the frame whereby the truck may be conveniently moved with but very little tilting.

3. A truck comprising a frame provided with supporting wheels at its lower end, clamp arms having vertical axes mounted on the respective outer faces of said frame to swing inward and forward in front of the truck, in a single plane transverse to the longitudinal extension of the truck frame, and operating means movably mounted on the truck frame and connected to said clamp arms to operate the same simultaneously, said operating means comprising a frame pivoted to the truck frame, and gearing connecting said operating frame to said clamp arms.

4. A truck comprising a frame having side bars and provided with supporting wheels at the lower end thereof, clamp arms pivotally mounted on the respective side bars of said frame to swing inward and forward in front of the truck in a plane at right angles thereto, and operating means movably mounted on the truck frame and connected to said clamp arms to operate the same simultaneously, said operating means comprising a frame pivoted to the truck frame, gearing connecting said operating frame to said clamp arms, and means for retaining said operating means in operated position.

5. A truck comprising a frame having side bars and provided with supporting wheels at the lower end thereof, clamp arms pivotally mounted on the respective side bars of said frame to swing inward and forward in front of the truck in a plane at right angles thereto, and operating means movably mounted on the truck frame and connected to said clamp arms to operate the same simultaneously, said operating means comprising a frame pivoted to the truck frame, gearing connecting said operating frame to said clamp arms, means for retaining said operating means in operated position, and means for releasing said retaining means.

6. A truck comprising a frame, means pivotally mounted thereon near the lower end of the frame and adapted to swing inward to grip the load or to slide under the load and support the same, the path of movement of the gripping or supporting portion of said members being in a single plane at right angles to said frame.

7. A truck comprising a frame, and members pivoted thereon, and adapted to swing in front of said frame, means for operating said member provided with handles whereby the truck may be conveniently moved with but little tilting, said members arranged to move in a horizontal plane toward and away from the load.

8. A truck comprising a frame, members pivoted thereon on vertical axes and arranged to swing in a horizontal plane in front of said frame and toward and away from a load, said horizontal plane extending at a substantially right angle to the frame.

9. A truck comprising a frame, members pivoted thereon on vertical axes and extended in front of the frame and constructed and arranged to move in a single plane at a right angle to the frame toward and away from the load, and operating means connected with said members, adapted to lock the same in closed position.

10. A truck comprising a frame having side bars and supporting wheels at the lower end thereof, clamping or supporting members movably mounted on vertical axes on the outer faces of the sides of said frame and movable in a horizontal plane disposed transversely to the longitudinal extension of such frame, and means carried by said frame and operatively connected to said members for moving said members simultaneously.

11. A truck comprising a frame, clamping or supporting members movably mounted on vertical axes on the outer faces of the sides of said frame and movable in a horizontal plane disposed transversely to the longitudinal extension of such frame, and pivotal means connected with and carried by said frame and operatively connected to said members for moving said members simultaneously.

12. A truck having a frame, clamping or supporting members mounted on vertical axes on said frame, said axes being substantially parallel with the longitudinal plane of the frame, the members being adapted to swing inward and in front of said frame in a plane transversely to the longitudinal extension of said frame, a short secondary frame or lever pivotally mounted at one end in connection with said first frame and operatively connected to said members in such manner that the pivotal movement of said frame or lever actuates said members, the secondary frame being provided with handles whereby the truck may be conveniently wheeled with very little tilting.

13. A truck comprising a frame and supporting wheels thereon near one end thereof arranged for the transporting of articles in a substantially vertical position of the frame, supporting members mounted on axes extending longitudinally of said frame and near the wheel end thereof movable in a plane at substantially right angles to the longitudinal extension of the frame to support the articles in front of said frame, and means carried by said frame for simultaneously operating said supporting members.

14. A truck comprising a frame and supporting wheels thereon near one end thereof arranged for the transporting of articles in a substantially vertical position of the frame, supporting members mounted on axes extending longitudinally of said frame and near the wheel end thereof movable in a plane at substantially right angles to the longitudinal extension of the frame to support the articles in front of said frame, and means carried by said frame for simultaneously operating said supporting members, said means adapted to lock said members in supporting position.

15. A truck comprising a frame, members pivoted thereon on vertical axes and extending in front of the frame and constructed and arranged to move in a single plane transverse to the longitudinal extension of the frame and toward and away from the load, and operating means connected with said members for simultaneously operating said members.

16. A truck comprising a frame and supporting wheels near one end for transporting articles in a substantially vertical position on the frame, supporting members mounted on axes extending longitudinally of said frame and movable on said axes in a single plane transverse the longitudinal extension of the truck frame, means for actuating said members simultaneously, and for locking the same in operated position.

In testimony whereof, I have hereunto set my hand at Riverside, California, this 19th day of May, 1913.

FRED STEBLER.

In presence of—
FREDERICK THAYER,
ARTHUR P. KNIGHT.

Copies of this patent may be obtained for five cents each, by addressing the "Commissioner of Patents, Washington, D. C."